US009565190B1

(12) United States Patent
Telvik et al.

(10) Patent No.: US 9,565,190 B1
(45) Date of Patent: Feb. 7, 2017

(54) DOMAIN JOIN AND MANAGED DIRECTORY SUPPORT FOR VIRTUAL COMPUTING ENVIRONMENTS

(71) Applicants: Erik Jonathan Telvik, Renton, WA (US); Gaurang Pankaj Mehta, Seattle, WA (US); Ajit Nagendra Padukone, Bellevue, WA (US); Chirag Pravin Pandya, Sammamish, WA (US); Colin Harrison Brace, Mercer Island, WA (US); Deepak Suryanarayanan, Bellevue, WA (US); Guruprakash Bangalore Rao, Bellevue, WA (US); Krithi Rai, Redmond, WA (US); Malcolm Russell Ah Kun, Kirkland, WA (US); Sameer Palande, Seattle, WA (US); Shon Kiran Shah, Redmond, WA (US); Vivek Lakshmanan, Seattle, WA (US)

(72) Inventors: Erik Jonathan Telvik, Renton, WA (US); Gaurang Pankaj Mehta, Seattle, WA (US); Ajit Nagendra Padukone, Bellevue, WA (US); Chirag Pravin Pandya, Sammamish, WA (US); Colin Harrison Brace, Mercer Island, WA (US); Deepak Suryanarayanan, Bellevue, WA (US); Guruprakash Bangalore Rao, Bellevue, WA (US); Krithi Rai, Redmond, WA (US); Malcolm Russell Ah Kun, Kirkland, WA (US); Sameer Palande, Seattle, WA (US); Shon Kiran Shah, Redmond, WA (US); Vivek Lakshmanan, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 91 days.

(21) Appl. No.: 14/536,137

(22) Filed: Nov. 7, 2014

(51) Int. Cl.
*G06F 7/04* (2006.01)
*G06F 15/16* (2006.01)
(Continued)

(52) U.S. Cl.
CPC .................... *H04L 63/0884* (2013.01)

(58) Field of Classification Search
CPC .................................. H04L 63/0884
(Continued)

(56) References Cited

U.S. PATENT DOCUMENTS 8,832,686 B2 * 9/2014 Smith ............... G06F 9/445
718/1
9,141,442 B1 * 9/2015 Voelcker ............ G06F 8/30
(Continued)

*Primary Examiner* — Dant Shaifer Harriman
(74) *Attorney, Agent, or Firm* — Davis Wright Tremaine LLP

(57) ABSTRACT

A virtual computing environment service may receive a request from a customer to provision a virtual computing environment and join the virtual computing environment to a managed directory. The virtual computing environment service may provision the virtual computing environment and uses a set of administrator credentials from the customer and a set of credentials corresponding to the environment to access the managed directory and request joining of the environment to the managed directory. In response, the managed directory may create a computer account corresponding to the environment and which enables the environment to be used to access the managed directory. The virtual computing environment service may then enable the customer to specify one or more users that may utilize the virtual computing environment to access the managed directory.

20 Claims, 9 Drawing Sheets

(51) Int. Cl.
*G06F 17/30* (2006.01)
*H04L 29/06* (2006.01)

(58) Field of Classification Search
USPC ............................................................. 726/9
See application file for complete search history.

(56) References Cited

U.S. PATENT DOCUMENTS

| | | | |
|---|---|---|---|
| 2003/0028653 A1* | 2/2003 | New, Jr. ................. | H04L 63/04 709/229 |
| 2003/0226039 A1* | 12/2003 | Maki .................... | G06F 21/6218 713/183 |
| 2006/0179143 A1* | 8/2006 | Walker .................. | G06F 9/5072 709/226 |
| 2013/0014243 A1* | 1/2013 | Chen .................... | H04L 67/2804 726/8 |

* cited by examiner

DOMAIN JOIN AND MANAGED DIRECTORY SUPPORT FOR VIRTUAL COMPUTING ENVIRONMENTS

BACKGROUND

Virtual computing environments are often configured to join one or more managed directories to enable users of these environments to access particular data. For instance, an administrator of a virtual computing environment may use a set of credentials to authenticate himself/herself and perform one or more actions to join a virtual computing environment to a managed directory. An administrator can utilize environment deployment tools or server imaging tools to perform the domain join between the managed directory and the particular virtual computing environment. Alternatively, this process can be performed manually, wherein the administrator uses his/her credentials through a graphical user interface or other application to join the virtual computing environment to a managed directory. However, the process of performing the domain join between the virtual computing environment and a managed directory can be labor intensive, adding expense and potential for error in the process.

BRIEF DESCRIPTION OF THE DRAWINGS

Various embodiments in accordance with the present disclosure will be described with reference to the drawings, in which.

DETAILED DESCRIPTION

Figure 1:
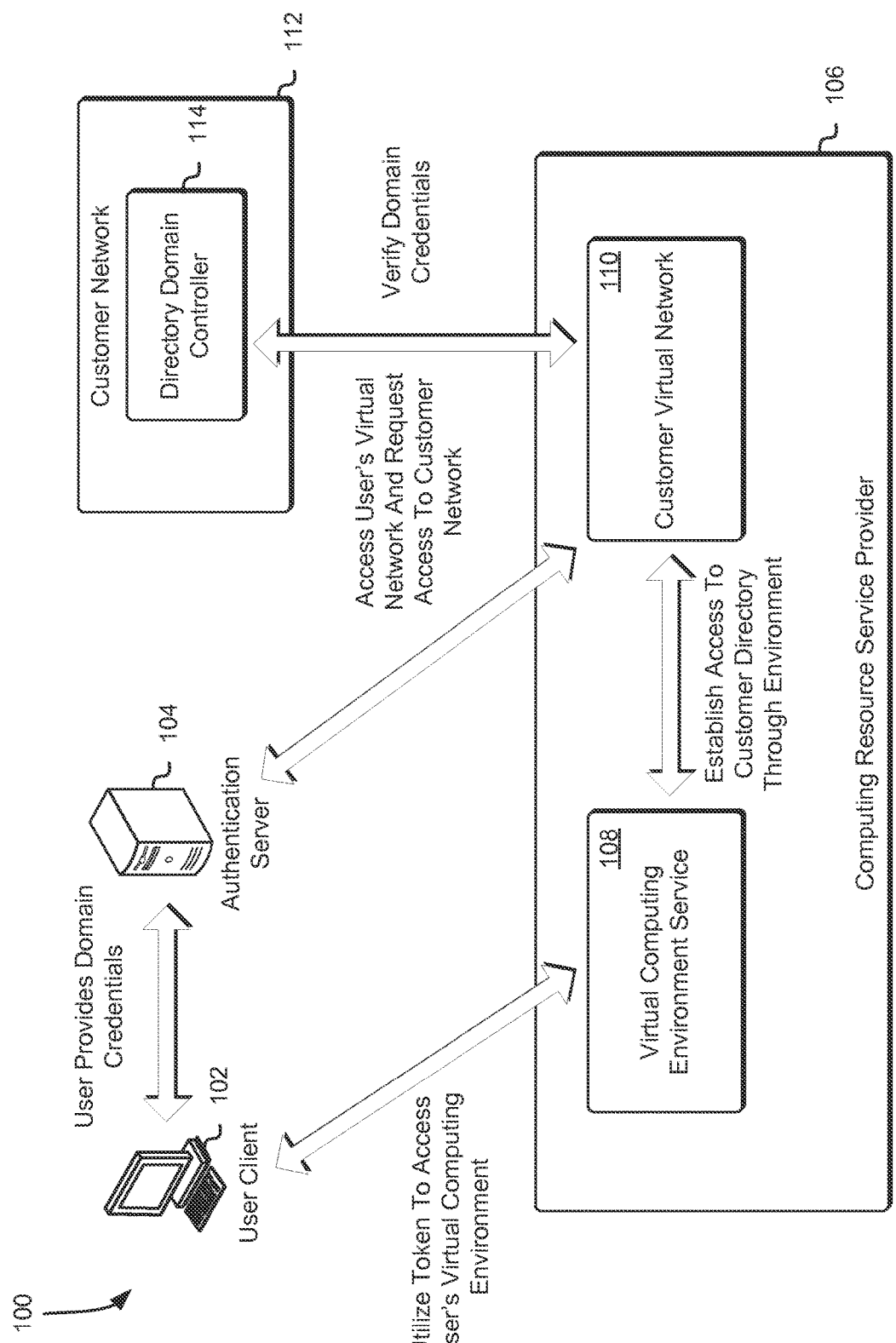
FIG. 1 shows an illustrative example of an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to the joining of a virtual computing environment to a managed directory through domain join operations. In an embodiment, an administrator associated with a customer, through a virtual computing environment service, requests provisioning of a virtual computing environment that may be utilized by the administrator and other designated users. The administrator may be required to provide a set of domain join credentials usable to identify the administrator and associated with an account specifying one or more permissions for accessing and creating computer objects within the directory. The domain join credentials may be utilized for causing the domain join of the virtual computing environment to a directory, provided through a managed directory service or through the customer's on-premises network. In response, the virtual computing environment service may transmit, through a virtual network interface associated with a customer virtual network provided by a virtual network service, a request to the customer's managed directory domain controller to request creation of a computer account within the customer's managed directory.

Once the computer account associated with the newly provisioned virtual computing environment has been created within the customer's managed directory, the administrator, through the virtual computing environment service, may add one or more user accounts to the newly provisioned virtual computing environment. For instance, the administrator may add domain credentials associated with a user to a local (e.g., relative to the virtual computing environment) group to enable user access to the virtual computing environment. These credentials may be utilized by the customer's managed directory to determine whether the user is authorized to access particular data stored within the managed directory or perform other actions as defined by the administrator.

In an embodiment, a user of a client provides to a set of domain credentials to an authentication server in order to access the newly provisioned virtual computing environment. The user may be associated with the customer through an employment relationship or other relationship. The authentication server may transmit these credentials to a domain controller of the customer's managed directory through a second virtual network interface associated with the customer virtual network provided by the virtual network service. If the managed directory domain controller is able to verify, based on the provided credentials, that the user is authorized to access the virtual computing environment, the managed directory domain controller may provide the authentication server with a token specifying an Internet Protocol (IP) address of a network gateway usable to access the virtual computing environment. Additionally, the managed directory domain controller may cause the virtual network interface to provide to the gateway an identifier corresponding to the user, such that the gateway may be able to identify the user when he/she attempts to access the virtual computing environment. The authentication server may provide the token to the user's client to enable access to the virtual computing environment.

Once the user's client has received the token from the authentication server, the user's client may utilize the IP address specified within the token to establish a communications channel with the network gateway. The user's client may provide the received token to the network gateway, which may be configured to determine whether the user is permitted to access the virtual computing environment. If the network gateway, based on the token, determines that the user is authorized to access the virtual computing environment, the network gateway may establish a secure communications channel between the user's client and the particular virtual computing environment. Further, the user may access the customer's managed directory through the virtual computing environment upon verification of the user's identity by the network gateway and the managed directory domain controller.

In this manner, a user may be able to utilize his/her own domain credentials to access a virtual computing environment joined to a customer's managed directory without requiring an administrator to manually perform the domain join process for the virtual computing environment and the customer's managed directory. In addition, the techniques described and suggested herein facilitate additional technical advantages. For example, because, in some embodiments, the credentials utilized to enable the domain join of the virtual computing environment to the customer's managed directory are not exposed to the user, a user may only be required to use one set of credentials to not only access the virtual computing environment, but also the customer's managed directory. Thus, a user is not required to provide a secondary set of credentials to establish the domain join between the virtual computing environment and the customer's managed directory.

FIG. 1 shows an illustrative example of an environment 100 in which various embodiments can be implemented. In the environment 100, a computing resource service provider 106 provides various computing resource services to customers of the computing resource service provider. The computing resource service provider 106 may be an organization that hosts various computing resources on behalf of one or more customers. For example, a computing resource service provider 106 may operate one or more facilities that are used to host various computing hardware resources, such as hardware servers, data storage devices, network devices and other equipment, such as server racks, networking cables and the like. The computing resource service provider 106 may utilize its computing hardware resources to operate one or more services. Such services may include services that enable customers of the computing resource service provider 106 to remotely manage computing resources to support the customers' operations while reducing the needs of the customers to invest in physical equipment. Example services include, but are not limited to, various data storage services (object-based data storage services, archival data storage services, database services and the like), identity management services, program execution services and other services. The services may be used by customers to support a wide variety of activities, such as operating a website, operating enterprise systems supporting an organization, distributed computation and/or other activities.

The customer may be an individual, organization or automated process that could utilize one or more services provided by the computing resource service provider 106 to provision and manage one or more resources to support his or her operations. The customer may further be an administrator or other domain user of a customer network 112, which may include a plurality of computing hardware resources which may be located at least in part on the customer premises. In some embodiments, the computing hardware resources that may be included within the customer network 112 include hardware servers, data storage devices, network devices and other equipment, such as server racks, networking cables and the like. The customer may utilize these computing hardware resources to operate one or more services, which may be utilized by a user, through a user client 102, to access computer system resources within the customer network 112. Accessing computer system resources may include creating resources, updating resources, deleting resources, obtaining information about the resources and the like.

In an embodiment, the customer network 112 includes one or more directories, which may be accessed by the user through the user client 102. These one or more directories may include customer data that may be accessible to authenticated entities, such as the user through the user client 102. The customer network 112 may provide access to customer managed directories by providing links to the customer directory locations such as by a uniform resource identifier (URI) object or some other such linkage. As may be contemplated, the URI may be provided by a computer system client device operating within the customer network 112, or by a process running at the data center, or by a process running on a computer system connected to the datacenter, or by a managed directory service or by a combination of these and/or other such computer system entities. The customer network 112 may further include a directory domain controller 114, which may be configured to enable domain joining of one or more directories within the customer network 112 and other computing environments. For instance, a customer may utilize the directory domain controller 114 to perform a domain join of one or more customer directories with one or more virtual computing environments or other computing environments.

Accordingly, as illustrated in FIG. 1, the environment 100 includes a virtual computing environment service 108 that may be provided by a computing resource service provider 106 to its customers and other delegated users. The virtual computing environment service 108 may comprise one or more physical hosts, which may be used to instantiate one or more virtual machine images. Further, the virtual computing environment that may be provisioned through the virtual computing environment service 108 may be a single-tenant (e.g., usable by only a single user at a time) desktop or other single-tenant virtual computing environment which may not employ a desktop metaphor. These one or more virtual machine images may include an operating system and one or more applications that, when instantiated, may be installed on one or more physical hosts within the virtual computing environment service 108. As with the user client 102, the virtual computing environment service 108 may provide customers and other users with a virtual computing environment interface, which may be used to interact with one or more applications available within the virtual computing environment.

In an embodiment, a customer or other administrator accesses the virtual computing environment service 108 to provision one or more virtual computing environments. Through an interface, the customer or other administrator (e.g., domain user) may specify the operating system and other applications that may be included for each of these virtual computing environments. Further, the customer or administrator may join these one or more virtual computing environments to his/her directories within the customer network 112. For instance, when a customer or other administrator provisions a virtual computing environment through the virtual computing environment service 108, the customer or other administrator may configure the virtual computing environment to be a part of the customer virtual network 110, which may be provisioned through use of a virtual network service provided by the computing resource service provider 106. Accordingly, the customer or other administrator may associate a virtual network interface to the particular virtual computing environment and establish a connection between the virtual computing environment and the customer's directory within the customer network 112. Through the virtual computing environment service 108, the customer or other administrator may provide particular environment credentials usable to access the customer network 112 and define one or more users authorized to utilize the virtual computing environment. While a virtual computing environment service 108 and virtual computing environments are used extensively throughout the present disclosure for the purpose of illustration, other computing resources associated with other services may be joined with a customer's directory. For instance, a customer or other administrator may provision a virtual machine instance through a virtual computer system service provided by a computing resource service provider. The customer or other administrator may configure the virtual machine instance to be part of the customer virtual network 110 and establish the connection between the instance and the customer's directory.

When the customer or other domain user joins the virtual computing environment to the directory within the customer network 112, the customer network 112 may create a computer account within the computer network 112 which may be associated with the newly provisioned virtual computing environment. Additionally, the customer or other domain user may define, through the virtual computing environment service 108, one or more users that are permitted to utilize the virtual computing environment. The virtual computing environment may include one or more agents that are configured to verify user identities and establish a connection between the virtual computing environment and the customer network 112 to enable access to the customer's directories.

Once the virtual computing environment has been provisioned and properly configured to enable access to the customer's directories, a user, through a user client 102, may be able to access the virtual computing environment. For instance, through the user client 102, a user may be able to utilize a computing resource service provider 106 interface to provide his/her customer domain credentials and request access to the virtual computing environment. This interface may be associated with an authentication server 104, which may be configured to provide, through the user client 102, the interface wherein a user may provide his/her domain credentials. When the user, through the user client 102, provides his/her domain credentials, the authentication server 104 may provide these credentials to the customer's directory domain controller 114, which may be accessible through a virtual network interface provided by the virtual network service and associated with the customers virtual network 110.

The customer's directory domain controller 114, upon receiving the domain credentials from the authentication server 104, may determine whether the user is authorized to access the virtual computing environment and the one or more directories within the customer network 112. If the directory domain controller 114 determines that the user is authorized to do so, the directory domain controller 114 may transmit a token to the authentication server 104, which may specify one or more identifiers for the user and an IP address of a network gateway usable to access the virtual computing environment. Additionally, the authentication server 104 may transmit a notification to the computing resource service provider 106 that the user has been authenticated and that communications are to be received from the user client 102. This may enable the computing resource service provider 106 to configure the network gateway to expect certain communications associated with a particular identifier.

Once the user client 102 receives the token from the authentication server 104, the user client 102 may establish a communications channel with the network gateway and provide the token to the network gateway. The network gateway, based at least in part on the identifiers specified within the token, may verify the identity of the user client 102 and establish a communications channel with the virtual computing environment service 108 and the customer's virtual computing environment. Further, the virtual computing environment service 108 may ensure that the virtual computing environment is connected, through the customers virtual network 110, to the customer network 112 and the one or more directories associated with the virtual computing environment. This may enable the user, through the user client 102, to utilize the virtual computing environment to interact with data stored within these directories.

Figure 2:
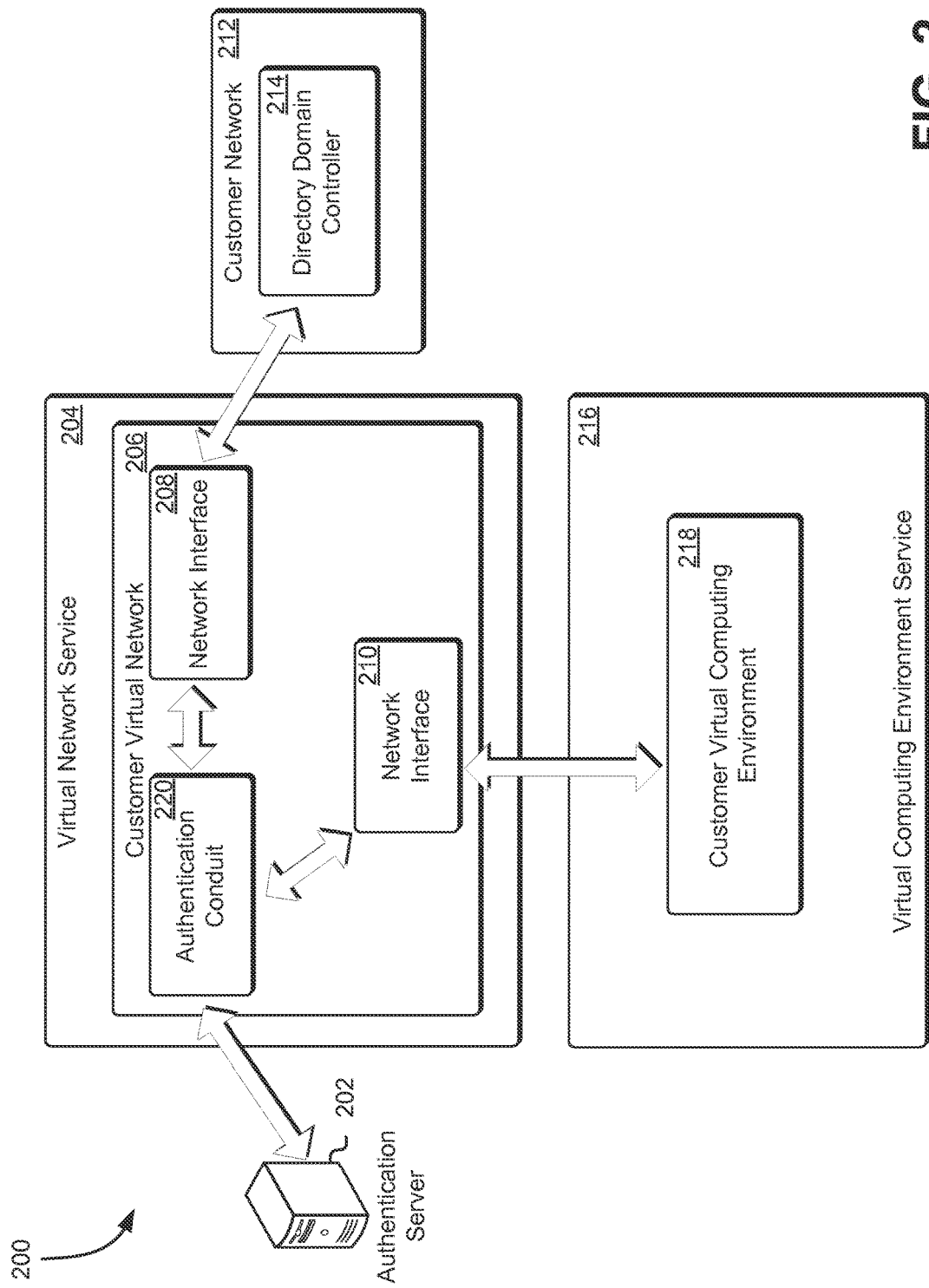
FIG. 2 shows an illustrative example of an environment in which a user is authenticated for access to a virtual computing environment through an authentication server based at least in part on a customer network directory domain controller in accordance with at least one embodiment.

As noted above, an authentication server may be utilized to obtain user domain credentials and authenticate this user based at least in part on communications with a directory domain controller of a customer network and the received credentials. If the user is authenticated, the authentication server may provide the user with a token usable to access the customer's virtual computing environment through the virtual computing environment service. Accordingly, FIG. 2 shows an illustrative example of an environment 200 in which a user is authenticated for access to a virtual computing environment 218 through an authentication server 202 based at least in part on a customer network directory domain controller 214 in accordance with at least one embodiment. The virtual computing environment 218 may include a virtual operating system desktop (also known as a "virtual desktop"), comprising an operating system and one or more applications that may be utilized within the desktop.

In the environment 200, an authentication server 202 may receive, from a user client, one or more domain credentials usable to access a customer network 212. The authentication server 202 may transmit the received one or more domain credentials to an authentication conduit 220, which may be configured to operate as a proxy server for transmitting the received domain credentials through a virtual network interface 208 within a customer virtual network 206 to a directory domain controller 214 within the customer network 212. The virtual network interface 208 may be attached to one or more computing resources within the customer's virtual network 206 (e.g., the authentication conduit 220), which a customer may provision through a virtual network service 204. The virtual network interface 208 may further include a public IP address, which may enable communications between the customer's virtual network 206 and the on-premises (e.g., customer data center or other customer facility) customer network 212. Accordingly, the authentication server 202, through the authentication conduit 220 and the virtual network interface 208, may transmit the received user domain credentials to a directory domain controller 214 within the customer network 212 for user authentication.

When the directory domain controller 214 receives the user's domain credentials from the virtual network interface 208, the directory domain controller 214 may access a user account data store to determine whether the user domain credentials are authentic and, if so, determine whether the user is authorized to access a virtual computing environment 218 within a virtual computing environment service 216 and, through the virtual computing environment 218, access the customer's directories within the customer network 212. Once the user has been authenticated and the one or more permissions determined, the directory domain controller 214 may provide an acknowledgment to the authentication server 202 that the user has been authenticated and is authorized to access the customer's virtual computing environment 218 and perform one or more actions. Additionally, the computing resource service provider may receive a notification that the authentication of the user was successful. This may cause the computing resource service provider to initiate a customer virtual computing environment 218 session within the virtual computing environment service 216 and provide a notification to a network gateway associated with the virtual computing environment service 216 specifying one or more identifiers associated with the user.

The authentication server 202 may utilize the acknowledgment from the directory domain controller 214 to generate a token, which may specify one or more user identifiers and an IP address of the network gateway. This token may enable the user client to access the network gateway, establish a communications channel with the network gateway, and provide the received token to enable the network gateway to verify the identity of the user client. Once the network gateway is able to verify the user's identity through use of the token, the network gateway may direct the user client to the newly established customer virtual computing environment 218 session within the virtual computing environment service 216.

When the user client establishes a secure communications channel with the virtual computing environment 218, the virtual computing environment 218, through an agent operating within the virtual computing environment 218, may transmit the machine credentials associated with the virtual computing environment 218 to a second virtual network interface 210 within the customer's virtual network 206. The second virtual network interface 210 may provide these machine credentials to the authentication conduit 220 which, through the first network interface 208, may transmit these machine credentials to the directory domain controller 214 to enable the directory domain controller 214 to verify that the virtual computing environment 218 may be utilized to enable the user to access the one or more managed directories within the customer network 212. Thus, if the machine credentials are determined to be authentic, the directory domain controller 214 may enable the virtual computing environment 218 to access these managed directories through the second virtual network interface 210. The agent operating within the virtual computing environment 218 may be configured to monitor the one or more managed directories to ensure that the request to join the virtual computing environment 218 to the one or more managed directories is fulfilled. For instance, if the machine credentials are not authentic or the domain credentials associated with the domain user are not valid, the directory domain controller 214 may deny the request to join the one or more managed directories to the virtual computing environment 218. The agent may receive a notification from the directory domain controller 214 to this effect and cause the agent to notify the domain user of the issue. Further, the agent may perform other actions to address such failures (e.g., transmit notification to an administrator or the customer regarding the issue, thereby enabling the administrator/customer to perform any remedial actions).

Figure 3:
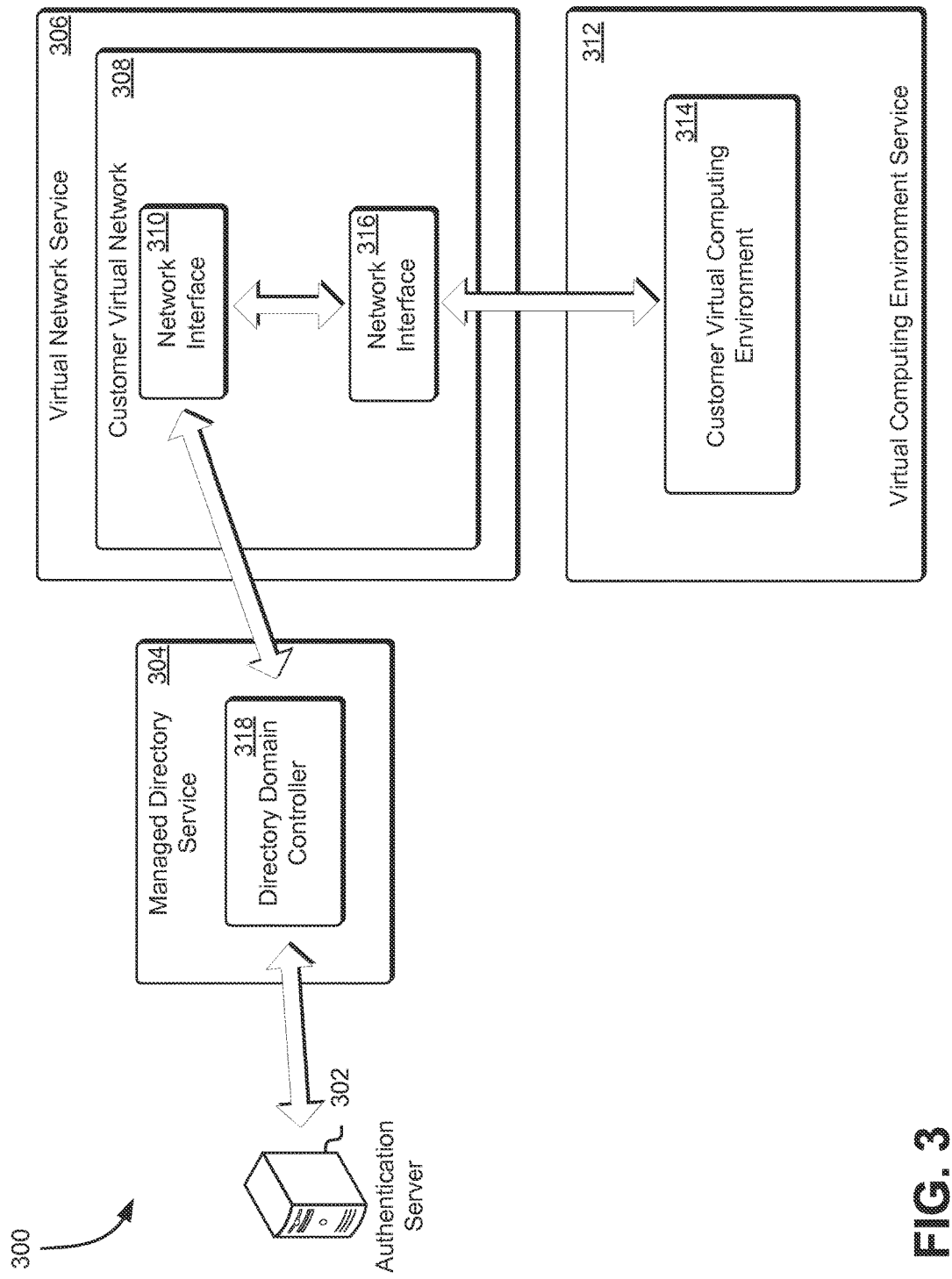
FIG. 3 shows an illustrative example of an environment in which a user is authenticated for access to a virtual computing environment through an authentication server based at least in part on user information within a managed directory service in accordance with at least one embodiment.

In an alternative embodiment, the customer maintains one or more managed directories through a managed directory service provided by the computing resource service provider. The managed directory service may provide directory services which may provide an authenticated entity access to the customer directories according to the authorization credentials and/or policies. For example, in an embodiment where a computer system entity may be authorized to read and write a certain data store on a customer directory, the ability to do so may be provided by the directory services. Directory services may provide access to customer directories by providing links to the customer directory locations such as by a uniform resource identifier (URI) object or some other such linkage. As may be contemplated, the URI may be provided by the computer system client device, or by a process running at the data center, or by a process running on a computer system connected to the datacenter, or by the managed directory service or by a combination of these and/or other such computer system entities. Thus, when a user, through the user client, provides one or more credentials in order to access the customer's virtual computing environment, the authentication server may verify, through the managed directory service, whether the user can be authenticated and is authorized to access the virtual computing environment. Accordingly, FIG. 3 shows an illustrative example of an environment 300 in which a user is authenticated for access to a virtual computing environment 314 through an authentication server 302 based at least in part on user information within a managed directory service 304 in accordance with at least one embodiment.

In the environment 300, an authentication server 302 may receive one or more sets of credentials from a user through his/her user client. As opposed to the environment illustrated above in connection with FIG. 2, wherein the authentication server may transmit the received credentials through an authentication conduit and a virtual network interface of the customer's virtual network to a directory domain controller within the customer network, in the environment 300, the authentication server 302 may instead provide the one or more sets of credentials directly to a directory domain controller 318 associated with a customer's managed directories managed by the managed directory service 304. The directory domain controller 318 may include an authentication service which may authenticate credentials of a user, computer system, process, automated process or other such entity to at least determine whether that entity is authorized to access the managed directory service 304 and/or the customer directories associated with the managed directory service 304. In some embodiments, the credentials may be authenticated by the managed directory service 304 itself, or they may be authenticated by a process, program or service under the control of the managed directory service 304, or they may be authenticated by a process, program or service that the managed directory service 304 may communicate with or they may be authenticated by a combination of these and/or other such services or entities.

Once the user has been authenticated, the managed directory service 304 may utilize authorization services included within the directory domain controller 318 which may authorize a user, computer system, process, automated process or other such entity to at least determine which actions of one or more possible actions that entity may perform. Examples of actions that an entity may or may not be authorized to perform include, but are not limited to, creating resources on the customer directory, destroying resources on the customer directory, attaching to resources on the customer directory, detaching from resources on the customer directory, providing access links to resources on the customer directory, reclaiming access links to resources on the customer directory, allowing reads from resources on the customer directory, allowing writes to resources on the customer directory and/or other such actions.

If the user can be authenticated and is authorized to perform one or more actions within the managed directory service 304 and the customer virtual computing environment 314, the managed directory service 304 may provide the authentication server 302 with a token specifying one or more identifiers for the user and an IP address of a network gateway usable to access the customer virtual computing environment 314 within the virtual computing environment service 312. The authentication server 302 may provide the token to the user client, which may utilize the IP address specified within the token to establish a communications channel with the network gateway. For instance, the user client may provide the network gateway with the token from the authentication server 302. The network gateway may utilize the one or more user identifiers specified within the token to verify the identity of the user and determine whether the user may access the customer virtual computing environment 314. If the user's identity can be verified, the network gateway may establish a communications channel between the user client and the virtual computing environment 314.

Once the user has established a communications channel with the customer virtual computing environment 314, the customer virtual computing environment 314 may communicate with the managed directory service 304 through a virtual network interface 310 of the customer's virtual network 308 to enable the user to utilize the virtual computing environment 314 to access the one or more managed directories maintained within the managed directory service 304. The customer's virtual network 308 may be provisioned by the customer through a virtual network service 306. The virtual network service 306 may enable the customer to manage a virtual network 308 comprising various computing resources provided by a computing resource service provider. Thus, the customer's virtual network 308, through use of one or more virtual network interfaces 310, 316, may facilitate communications between the virtual computing environment 314, the managed directory service 304 and the user client.

Figure 4:
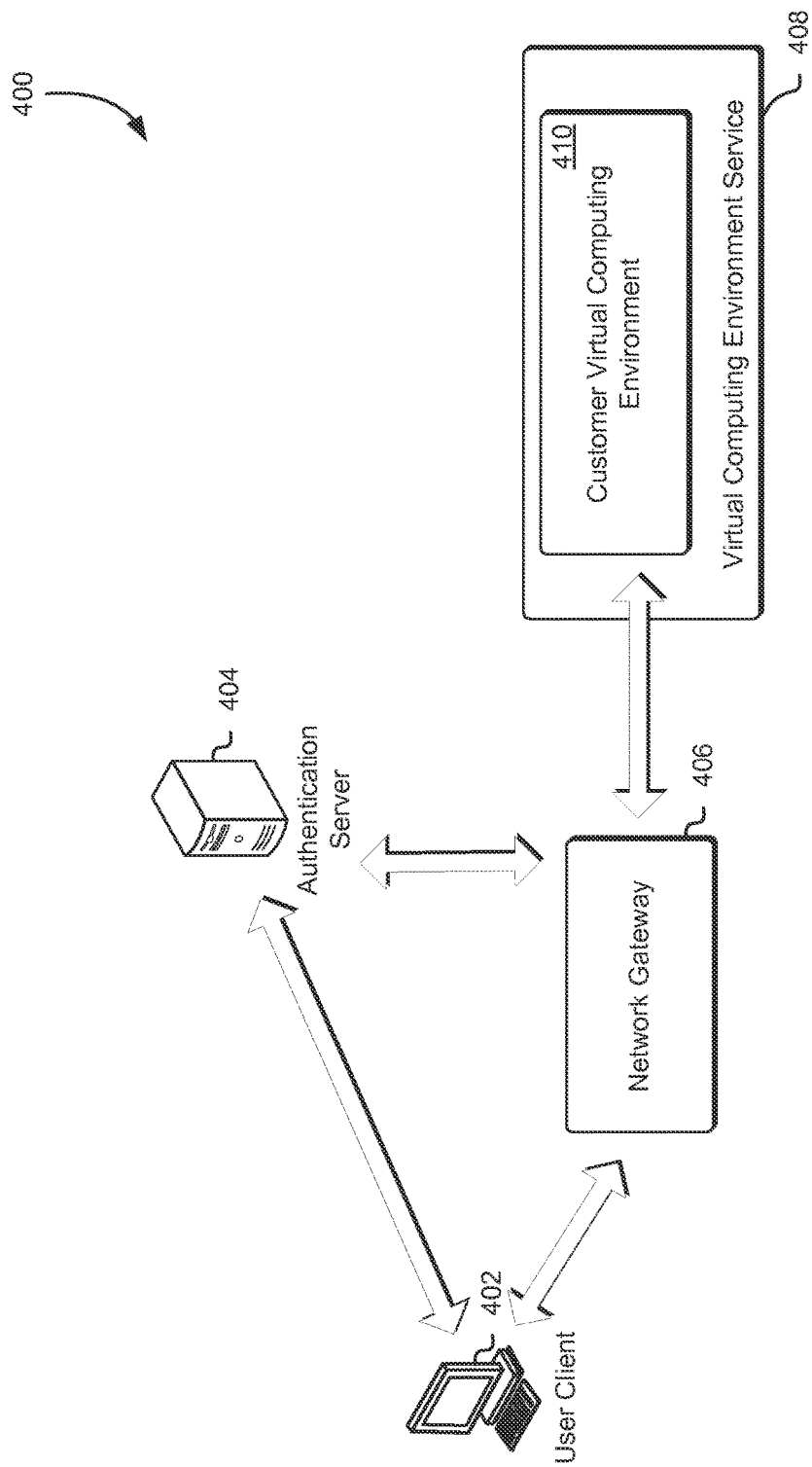
FIG. 4 shows an illustrative example of an environment in which a user client utilizes information from an authentication server to access a virtual computing environment in accordance with at least one embodiment.

As noted above, a user, through use of a user client, may utilize one or more sets of domain credentials associated with a customer network domain to access a virtual computing environment provided by a computing resource service provider. This virtual computing environment may be configured to access the customer network to enable use of one or more managed directories included therein. Accordingly, FIG. 4 shows an illustrative example of an environment 400 in which a user client 402 utilizes information from an authentication server 404 to access a virtual computing environment 410 in accordance with at least one embodiment. The user client 402 can include any appropriate device operable to send and/or receive requests, messages or information over an appropriate network and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like.

A user, through the user client 402, may utilize a computing resource service provider application to access the customer virtual computing environment 410 provisioned by the customer through the virtual computing environment service 408. This application may be configured to interact with an authentication server 404 to enable the user of the user client 402 to provide his/her customer domain credentials to the authentication server 404. The authentication server 404 may utilize one or more standards for authentication and authorization of users, such as the OAuth standard. For instance, as noted above, the authentication server 404 may transmit the received domain credentials through a virtual network interface within the customer's virtual network to the customer's on-premises network to authenticate the user and determine whether the user is authorized to access the customer's virtual computing environment 410. If the directory domain controller within the customer's on-premises network is able to authenticate the user and determine that the user is authorized to access the customer's virtual computing environment 410, the directory domain controller may transmit a notification to the authentication server 404 acknowledging the user's identity and authorization to access the customer's virtual computing environment 410.

When the authentication server 404 receives the notification from the directory domain controller, the authentication server 404 may generate one or more access tokens, which may specify the identity of the user utilizing the user client 402, any user group memberships within the virtual computing environment 410, and the user's privileges within the virtual computing environment 410. Further, the one or more access tokens may specify an IP address of a network gateway 406, which may enable the user client 402 to communicate with the network gateway 406 to establish a communications channel, through the network gateway 406, with the customer's virtual computing environment 410. The network gateway 406 may be configured to receive one or more notifications from the computing resource service provider upon authentication of the user. For instance, the computing resource service provider may transmit a notification to the network gateway 406 specifying one or more identifiers corresponding to the user and an IP address associated with the user client 402. The one or more identifiers may be the same identifiers specified within the one or more access tokens provided to the user client 402.

Once the user client 402 receives the one or more access tokens from the authentication server 404, the user client 402 may utilize the IP address specified within these one or more access tokens to interact with the network gateway 406 and attempt to establish a communications channel with the customer's virtual computing environment 410 through the virtual computing environment service 408. The network gateway 406, upon receiving the one or more access tokens from the user client 402, may determine whether the one or more identifiers specified within the one or more access tokens correspond to the one or more identifiers provided by the computing resource service provider upon authentication of the user. For instance, the network gateway 406 may communicate with the authentication server 404 to determine the validity of the one or more access tokens received from the user client 402. If the one or more access tokens are deemed valid, the network gateway 406 may determine whether the one or more identifiers match. If the identifiers match, the network gateway 406 may establish a secure communications channel between the user client 402 and the customer virtual computing environment 410, thus enabling the user client 402 to access the customer virtual computing environment 410.

Figure 5:
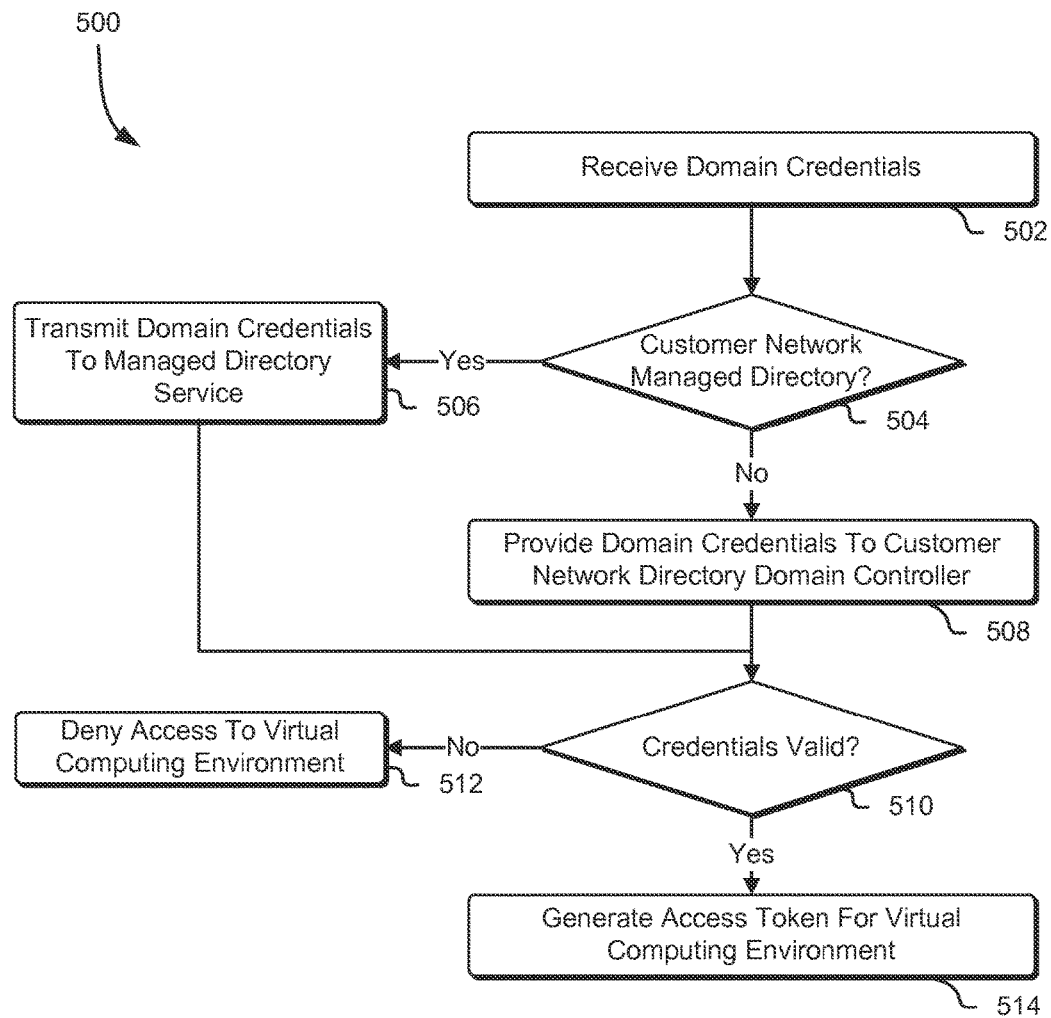
FIG. 5 shows an illustrative example of a process for authenticating a user for access to a virtual computing environment joined to a managed directory in accordance with at least one embodiment.

As noted above, when a user through his/her user client provides one or more sets of domain credentials to an authentication server, the authentication server may transmit these credentials to a directory domain controller within a customer network to determine whether the user may be authenticated and is authorized to access the customer's virtual computing environment. If the user is authenticated and is authorized to access the virtual computing environment, the authentication server may provide the user client with one or more access tokens, which may enable the user client to establish a secure communications channel with the virtual computing environment and, hence, the customer's managed directories. Accordingly, FIG. 5 shows an illustrative example of a process 500 for authenticating a user for access to a virtual computing environment joined to a managed directory in accordance with at least one embodiment. The process 500 may be performed by the aforementioned authentication server, which may be configured to enable users, through user clients, to provide one or more sets of domain credentials. Further, the authentication server may be configured to communicate with a directory domain controller within a customer network through a virtual network interface component of the customer's virtual network provided by the virtual network service. Alternatively, if the customer's one or more managed directories are maintained within a managed directory service provided by a computing resource service provider, the authentication server may be configured to interact with this managed directory service to authenticate the user.

When a user utilizes his/her user client to launch a computing resource service provider application to access the virtual computing environment, the application may transmit a request to the authentication server, such as through one or more application programming interface (API) calls to the authentication server, to obtain one or more authentication interfaces. The authentication interface may enable the user to provide his/her domain credentials for use within the customer network to the authentication server. For example, if the authentication server utilizes the OAuth standard for authentication and authorization, the authentication server may provide the user client with a Hypertext Transfer Protocol (HTTP) response in the form of one or more HyperText Markup Language (HTML) pages. These HTML pages may include one or more input fields, which may be used by the user of the user client to input his/her domain credentials. Thus, the authentication server, through these HTML pages or other response may receive 502 the one or more sets of credentials from the user client.

Once the authentication server has received the one or more sets of credentials from the user client, the authentication server may determine 504 whether the customer's one or more managed directories are maintained within a managed directory service or reside in the customer's on-premises network. For instance, the authentication server may utilize information included with the domain credentials to identify the particular customer whose virtual computing environment and managed directories the user is trying to access. Based at least in part on one or more customer identifiers included with the domain credentials, the authentication server may identify any customer computing resources maintained by the computing resource service provider, the configuration of a customer's virtual network, and information usable for accessing the customer's on-premises network through the customer's virtual network.

If the one or more managed directories reside within a managed directory service provided by the computing resource service provider, the authentication server may transmit 506 the received one or more sets of credentials to the managed directory service. The managed directory service, as noted above, may include authentication and authorization services, which may be configured to verify the user's credentials and determine one or more permissions and/or restrictions applicable to the user, respectively. For instance, the authentication service within the managed directory service may include a user account data store, which may include one or more user accounts corresponding to each user registered with the managed directory service. Each user account may specify one or more user names and corresponding passwords, which may serve as the user's credentials for accessing the managed directory service. Thus, when the authentication server provides the user's domain credentials to the managed directory service, the authentication service may utilize these credentials to determine whether the credentials correspond to a user account stored therein. If the user domain credentials correspond to a user account, the managed directory service may utilize one or more user identifiers to determine, through the authorization service, whether the user is authorized to access the customer's managed directories. If the user is authorized to do so, the managed directory service may transmit a notification to the authentication server indicating that the user has been authenticated and is authorized to access the customer's managed directories.

Alternatively, if the one or more managed directories reside within the customer's on-premises network, the authentication server may access a virtual network interface within the customer's virtual network to provide 508 the one or more sets of credentials to a directory domain controller within the customer's on-premises network. The directory domain controller may utilize the received one or more sets of credentials from the user to determine whether the user may be authenticated and whether the user is authorized to access the one or more managed directories maintained within the customer's on-premises network. If the directory domain controller is able to authenticate the user and determine that the user is authorized to access the customer's managed directories, the directory domain controller may transmit a notification to the authentication server indicating that the user has been authenticated and is authorized to access these managed directories.

Based at least in part on the notification received from either the managed directory service or the directory domain controller, the authentication server may determine 510 whether the one or more sets of credentials provided by the user are valid. If the authentication server determines that the one or more sets of credentials are not valid (e.g., the user could not be authenticated and/or does not have the requisite permissions to access customer resources), the authentication server may deny 512 the user access to the customer's virtual computing environment. However, if the authentication server determines, based at least in part on the notification, that the credentials are valid, the authentication server may generate an access token, which the user client may utilize to access the virtual computing environment. The access token may specify an IP address of the virtual computing environment and a network gateway, which may receive the token and determine whether to enable the user client to establish a communications channel with the virtual computing environment. Further, the access token may specify one or more user identifiers, which the network gateway may utilize to determine whether the user client may establish the communications channel with the virtual computing environment. For instance, as will be described in greater detail below, when the authentication server receives the notification from the directory domain controller or the managed directory service, the computing resource service provider may transmit a notification to the network gateway specifying the one or more user identifiers that are included within the access token.

Figure 6:
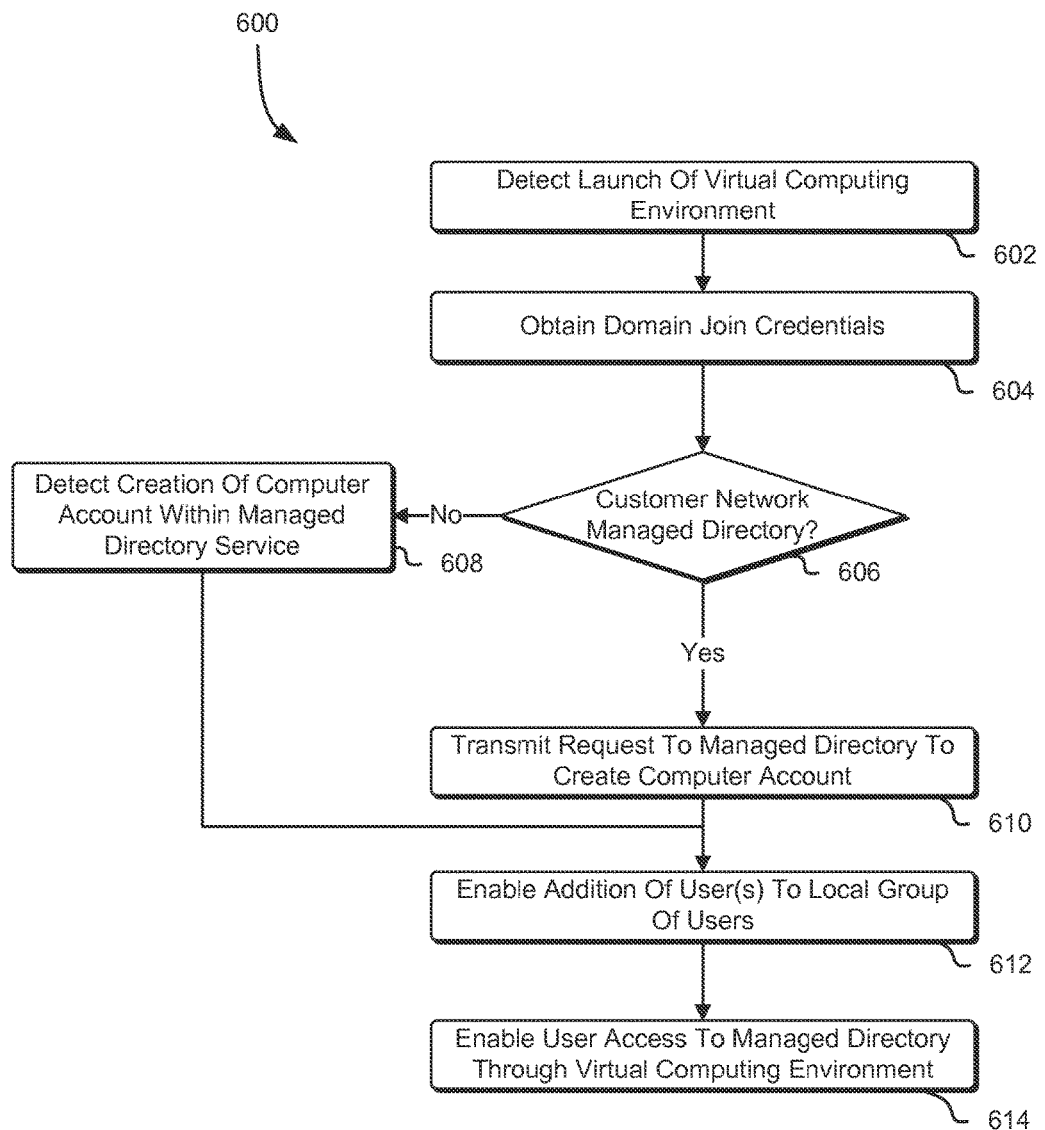
FIG. 6 shows an illustrative example of a process for joining a managed directory to a virtual computing environment and enabling user access to the virtual computing environment in accordance with at least one embodiment.

As noted above, a customer or other administrator may configure a virtual computing environment to access one or more managed directories within a managed directory service or within the customer's on-premises network. For instance, the customer or other administrator may access a virtual computing environment service to request provisioning of a new virtual computing environment. Through this service, the customer or other administrator may establish a connection between the virtual computing environment and the customer's managed directories and specify one or more users that may utilize the virtual computing environment to access these managed directories. Accordingly, FIG. 6 shows an illustrative example of a process 600 for joining a managed directory to a virtual computing environment and enabling user access to the virtual computing environment in accordance with at least one embodiment. The process 600 may be performed by the aforementioned virtual computing environment service, which may be provided by a computing resource service provider to its customers for provisioning and use of one or more virtual computing environments.

When a customer or other administrator first accesses the virtual computing environment service, he/she may request provisioning of one or more virtual computing environments, which delegated users may utilize to interact with one or more applications and data as defined by the customer or other administrator. Further, the customer or other administrator may configure the virtual computing environment to enable users to access one or more managed directories within the customer's on-premises directory or maintained by a managed directory service. Thus, the virtual computing environment service may detect 602 the launch of a new virtual computing environment and receive 604, from the customer or other domain user, a set of domain join credentials usable to access the customer's managed directories either within the customer's on-premises network or in the managed directory service and join these managed directories to the newly provisioned environment. The domain join credentials may be encrypted, such that the credentials may be passed to a directory domain controller securely and enable the directory domain controller or other computing resource to decrypt these credentials. Alternatively, the domain join credentials may be decrypted by an agent operating within the newly provisioned virtual computing environment. The domain join credentials may be encrypted in a manner that does not require administrator input (e.g., virtual computing environment service, through the agent, may encrypt the credentials and provide these to domain users as needed).

The virtual computing environment, upon initial launch, may generate one or more sets of environment credentials that may be unique to the environment. These credentials may be used by other services and resources to authenticate the virtual computing environment when it attempts to access these other services and resources on behalf of a user of the environment. The virtual computing environment service may first determine 606 whether to transmit these environment credentials along with the domain join credentials to either the managed directory service or directory domain controller within the customer network 606. If the virtual computing environment service determines that the domain join credentials and the environment credentials are to be transmitted to the managed directory service, the virtual computing environment service may transmit these credentials to the managed directory service and detect 608 creation of a computer account within the managed directory service that may be associated with the customer's managed directories. Alternatively, if the customer directories are maintained within the customer's network, the virtual computing environment service may transmit these environment credentials along with the domain join credentials to the customer network directory domain controller to request 610 creation of a computer account associated with the virtual computing environment. This computer account may specify one or more IP addresses corresponding to the virtual computing environment, as well as the one or more environment credentials associated with the environment and received from the virtual computing environment.

When the customer network directory domain controller receives the request from the virtual computing environment, the directory domain controller may refer to one or more user accounts within a user account data store to determine whether the customer or other domain user is authorized to perform a domain join of the virtual computing environment and the one or more managed directories. Based at least in part on this determination, the managed directory service or directory domain controller may generate a computer account associated with the virtual computing environment that may be configured to enable the virtual computing environment to access the managed directories.

If the credentials provided by the customer or other administrator are not valid (e.g., directory domain controller is unable to authenticate the customer/domain user or the customer/domain user is not authorized to perform the domain join), the virtual computing environment service may deny the customer or other domain user request to join the virtual computing environment to the one or more managed directories. However, if the customer or other domain user credentials are valid and the domain join between the virtual computing environment and the one or more managed directories is successful, the virtual computing environment service may enable 612 the customer or other domain user to add one or more users to a local group of users that may access this newly provisioned virtual computing environment. For instance, the customer or other domain user may specify one or more user identifiers corresponding to each user permitted to access this virtual computing environment. These user identifiers may be further specified within the managed directory, such that when the user utilizes the user client to access the virtual computing environment using his/her domain credentials, the authentication server may be able to obtain these user identifiers and include them within the access token.

Once the customer or other domain user has specified which one or more users may access the virtual computing environment, the virtual computing environment service may enable 614 user access to the one or more managed directories through the virtual computing environment. For instance, the virtual computing environment service may transmit a request to the managed directory service or the directory domain controller to ensure that the users specified within the virtual computing environment correspond to one or more users of the one or more directories. This may ensure a seamless process when a user accesses the virtual computing environment and attempts to interact with the one or more managed directories.

Figure 7:
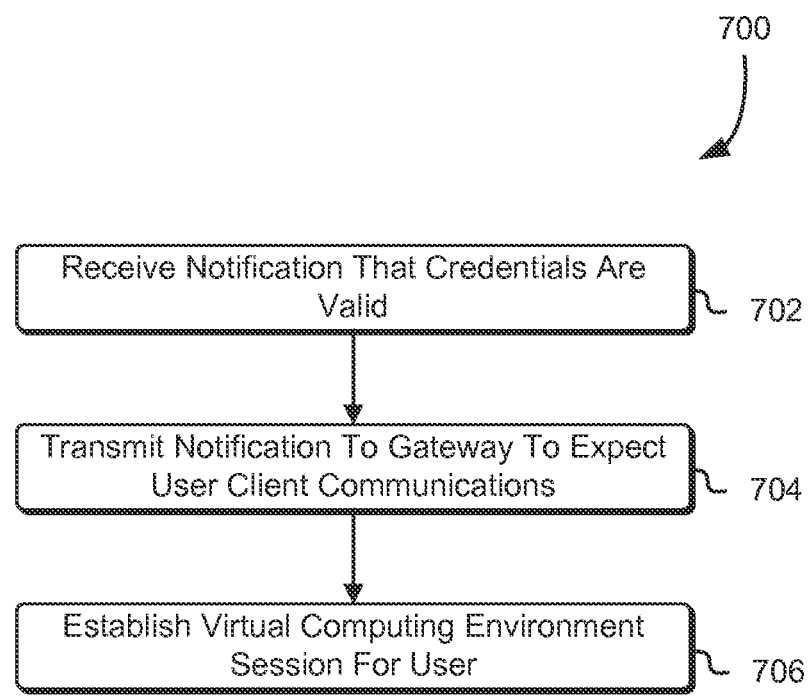
FIG. 7 shows an illustrative example of a process for configuring a network gateway for enabling a user to access a virtual computing environment in accordance with at least one embodiment.

As noted above, once the authentication server has received a notification from a directory domain controller within the customer's on-premises network or from a managed directory service provided by a computing resource service provider that a user's domain credentials are valid, the authentication server may generate one or more access tokens that may enable the user client to access the virtual computing environment. Additionally, the authentication server may transmit a notification to the computing resource service provider, specifying the one or more user identifiers and/or IP address corresponding to the user client being used to access the virtual computing environment. This may enable the computing resource service provider to provide the user identifiers and/or IP address to a network gateway, which may be used to enable establishment of a secure communications channel between the user client and the particular virtual computing environment. Accordingly, FIG. 7 shows an illustrative example of a process 700 for configuring a network gateway for enabling a user to access a virtual computing environment in accordance with at least one embodiment. The process 700 may be performed by the aforementioned computing resource service provider or a management sub-system operating on behalf of the service provider.

When the directory domain controller within the customer's on-premises network or the managed directory service determine that a user's credentials are valid and that the user is authorized to access the customer's virtual computing environment, the authentication server may receive a notification indicating that the user's domain credentials are valid. This may enable the authentication server to generate the one or more access tokens necessary for the user client to access the virtual computing environment. Further, the authentication server may transmit a notification to the computing resource service provider indicating that the user's domain credentials are valid, as well one or more identifiers corresponding to the user within the computing resource service provider domain. Thus, the computing resource service provider may receive 702 a notification from the authentication server that the credentials supplied by the user are valid.

Once the computing resource service provider has received the notification from the authentication server, the computing resource service provider may transmit 704 a notification to the network gateway in order to indicate that the user client will be attempting to access the virtual computing environment. This notification may specify the IP address associated with the user client, as well as other user identifiers that may be used to identify the user and ensure access to the correct virtual computing environment. Additionally, the computing resource service provider may access the virtual computing environment service to establish 706 a virtual computing environment session for the particular user. The computing resource service provider may establish a virtual network interface for the virtual computing environment to enable communications from the user client to the virtual computing environment and from the virtual computing environment to the one or more managed directories joined to the environment.

Figure 8:
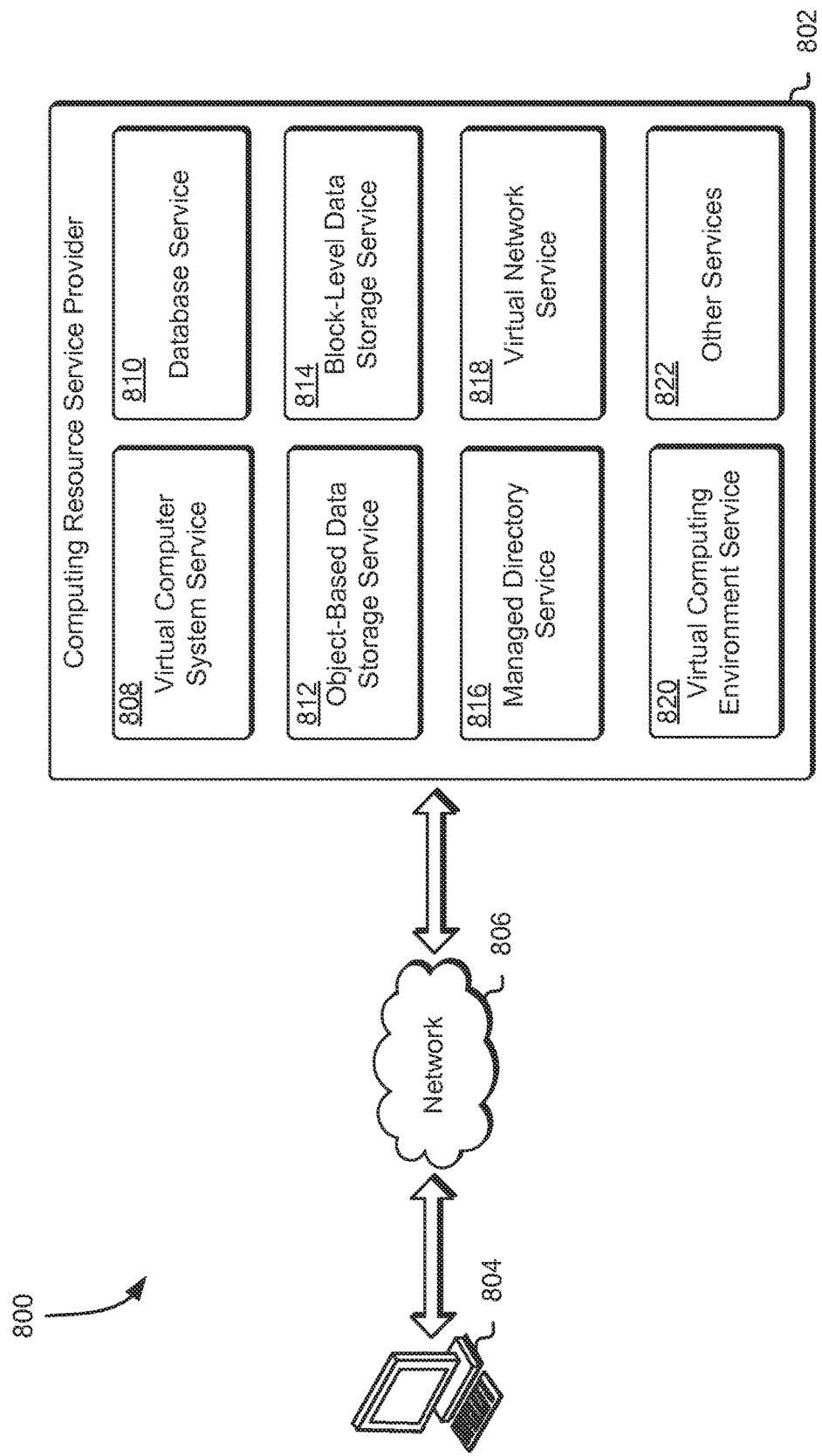
FIG. 8 shows an illustrative example of an environment in which various embodiments can be implemented.

FIG. 8 shows an illustrative example of an environment 800 in which various embodiments can be implemented. In the environment 800, a computing resource service provider 802 may provide a variety of services to a customer 804 or other users. The customer 804 may be an organization that may utilize the various services provided by the computing resource service provider 802 to remotely generate and maintain one or more resources and provide a mapping of user roles for use within a customer network to enable management of one or more delegated access permissions to define a level of access for users of his or her resources. As illustrated in FIG. 8, the customer 804 may communicate with the computing resource service provider 802 through one or more communications networks 806, such as the Internet. Some communications from the customer 804 to the computing resource service provider 802 may cause the computing resource service provider 802 to operate in accordance with various techniques described herein or variations thereof.

As noted above, a computing resource service provider 802 may provide various computing resource services to its customers. For instance, in this particular illustrative example, the computing resource service provider 802 provides at least seven types of services. The services provided by the computing resource service provider, in this example, include a virtual computer system service 808, a database service 810, an object-based data storage service 812, a block-level data storage service 814, a managed directory service 816, a virtual network service 818, a virtual computing environment service 820 and one or more other services 822, although not all embodiments of the present disclosure will include all such services and additional services may be provided in addition to or as an alternative to services explicitly described herein.

The virtual computer system service 808 may be a collection of computing resources configured to instantiate virtual machine instances onto virtual computer systems on behalf of the customers 804 of the computing resource service provider 802. Customers 804 of the computing resource service provider 802 may interact with the virtual computer system service 808 to provision and operate virtual computer systems that are instantiated on physical computing devices hosted (e.g., physical hosts) and operated by the computing resource service provider 802. The virtual computer systems may be used for various purposes, such as to operate as servers supporting a website. Other applications for the virtual computer systems may be to support database applications, electronic commerce applications, business applications and/or other applications.

The object-based data storage service 812 may comprise a collection of computing resources that collectively operate to store data for a customer 804. The data stored in the data storage service 812 may be organized into data objects. The data objects may have arbitrary sizes except, perhaps, for certain constraints on size. Thus, the object-based data storage service 812 may store numerous data objects of varying sizes. The object-based data storage service 812 may operate as a key value store that associates data objects with identifiers of the data objects which may be used by the customer to retrieve or perform other operations in connection with the data objects stored by the object-based data storage service 812. Access to the object-based data storage service 812 may be through appropriately configured API calls.

The block-level data storage service 814 may comprise a collection of computing resources that collectively operate to store data for a customer. For instance, the block-level data storage system may be configured to provide block-level data storage volumes for use with a virtual machine instance, as noted above. A customer may interact with the block-level data storage service 814 to provision a block-level data storage volume that, in turn, may be mounted as a storage device (e.g., hard drive) onto a virtual machine instance. The storage volume may be configured to behave like a raw, unformatted block storage device with a block level customer interface. Accordingly, a customer, through properly configured API calls to the service, may create a file system on top of the block-level data storage volumes or utilize the volume as a block-level storage device (e.g., a hard drive).

The managed directory service 816 may provide a variety of services to enable computer systems and/or computer system client devices to access customer directories including, but not limited to, authentication, authorization and directory services. For example, the managed directory service 816 may provide authentication services which may authenticate credentials of a user, computer system, process, automated process or other such entity to at least determine whether that entity is authorized to access the managed directory service 816 and/or the customer directories associated with the managed directory service 816. In some embodiments, the credentials may be authenticated by the managed directory service 816 itself, or they may be authenticated by a process, program or service under the control of the managed directory service 816, or they may be authenticated by a process, program or service that the managed directory service 816 may communicate with, or they may be authenticated by a combination of these and/or other such services or entities.

The managed directory service 816 may also provide authorization services which may authorize a user, computer system, process, automated process or other such entity to at least determine which actions of one or more possible actions that entity may perform. Examples of actions that an entity may or may not be authorized to perform include, but are not limited to, creating directories on the customer directory, destroying directories on the customer directory, attaching to directories on the customer directory, detaching from directories on the customer directory, providing access links to directories on the customer directory, reclaiming access links to directories on the customer directory, allowing reads from directories on the customer directory, allowing writes to directories on the customer directory and/or other such actions.

The managed directory service 816 may also provide directory services which may provide an authenticated entity access to the customer directories according to the authorization credentials and/or policies. For example, in an embodiment where a computer system entity may be authorized to read and write a certain data store on a customer directory, the ability to do so may be provided by the directory services. Directory services may provide access to customer directories by providing links to the customer directory locations such as by a URI object or some other such linkage. As may be contemplated, the URI may be provided by the computer system client device, or by a process running at the data center, or by a process running on a computer system connected to the data center, or by the managed directory service 816, or by a combination of these and/or other such computer system entities.

The virtual network service 818 may enable customers to provision a logically isolated virtual network within the computing resource service provider 802 environment. Within this isolated virtual network, a customer 804 may be able to define a range of IP addresses for various computing resources and configure network gateways and virtual network interfaces to enable public communications with these computing resources. Through the virtual network service 818, a customer 804 may be able to create a network connection between his/her on-premises network and the virtual network, such that the computing resources within the computing resource service provider 802 environment may be able to access computing resources located within the customer's on-premises network.

The virtual computing environment service 820 may allow customers 804 to interact, through the interface, with one or more virtual computing environments. For instance, the virtual computing environment service 820 may enable customers 804 to remotely manage and maintain one or more virtual machine images. These virtual machine images may be maintained in data storage within a virtual machine image data store. When a customer 804 submits a request for provisioning a virtual machine instance, the virtual computing environment service 820 may identify the machine image the customer 804 has requested and allocate the resources necessary (e.g., the processors and random-access memory (RAM) required to operate the components of the machine image) to process the machine image. The machine image may be instantiated on one or more physical storage devices (e.g., one or more servers or hard drives) that may act as a physical host for the instance. The virtual computing environment may be configured to communicate with one or more managed directories through the managed directory service 816 or through a directory domain controller within the customer's 804 on-premises network.

Figure 9:
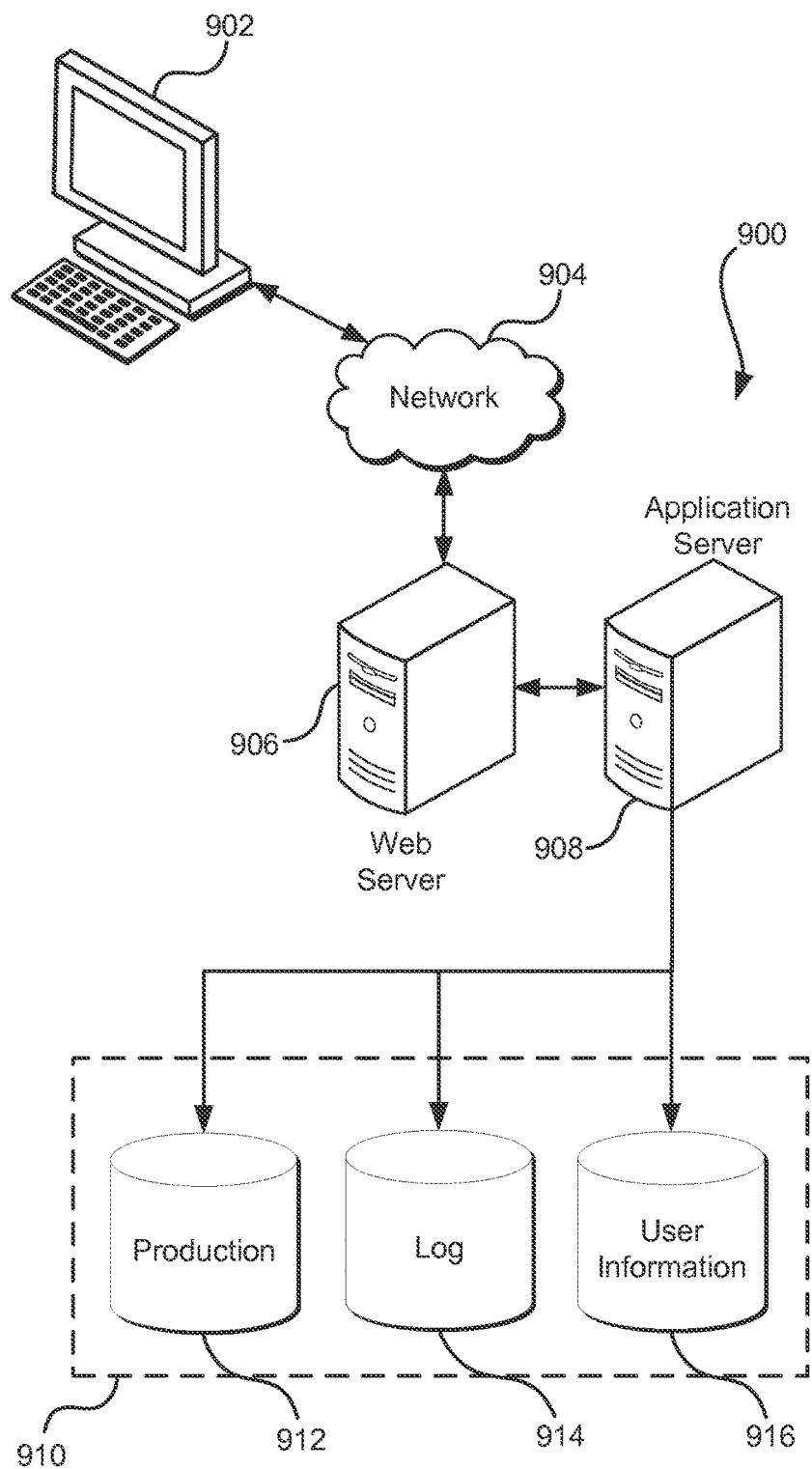
FIG. 9 shows an illustrative example of an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 902 and the application server 908, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein. cm What is claimed is:

What is claimed is:

1. A computer-implemented method comprising:
    receiving a first request to provision a virtual computing environment, the request including a set of encrypted domain join credentials capable of being decrypted through the virtual computing environment and usable to authenticate a domain user of the virtual computing environment, the set of domain join credentials associated with an account specifying one or more permissions for accessing and creating computer objects within a directory;
    provisioning the virtual computing environment;
    transmitting, to the directory, a second request to join the virtual computing environment to the directory, the second request including the set of domain join credentials and a set of machine credentials corresponding to the virtual computing environment;
    adding one or more user accounts to a group of user accounts specifying one or more users authorized to access the virtual computing environment;
    receiving, from a computer system, one or more access tokens, the one or more access tokens specifying an identifier corresponding to a user account; and
    as a result of the identifier corresponding to a user account of the one or more user accounts, establishing a communications channel between the virtual computing environment and the computer system.

2. The computer-implemented method of claim 1, wherein transmitting the second request to the directory includes:
    establishing a communications channel with a directory domain controller of an on-premises network, managed on behalf of a customer, through a virtual network interface; and
    transmitting, through the communications channel, the second request to the directory domain controller to enable joining of the virtual computing environment and the directory.

3. The computer-implemented method of claim 1, wherein the directory is a managed directory managed on behalf of the customer within a managed directory service provided by a computing resource service provider.

4. The computer-implemented method of claim 1, wherein:
    the one or more access tokens further specify an Internet Protocol address of a network gateway usable to establish the communications channel with the virtual computing environment; and
    the method further comprises using the Internet Protocol address to access the network gateway to provide the one or more access tokens to enable the network gateway to establish the communications channel.

5. A system, comprising at least one computer to implement one or more services, wherein the one or more services:
    receive a first request to provision a virtual computing resource, the request including a set of encrypted domain join credentials decryptable by the virtual computing resource and usable to enable joining the virtual computing resource to a directory;
    provision the virtual computing resource;
    transmit a second request to join the virtual computing resource to the directory, the second request including the set of encrypted domain join credentials and one or more machine credentials corresponding to the virtual computing resource thereby causing a computer account to be added to the directory, the computer account being accessible using the one or more machine credentials; and
    enable one or more users to access the directory through use of the virtual computing resource.

6. The system of claim 5, wherein the computing resource is a virtual computing environment.

7. The system of claim 6, wherein the virtual computing environment is a virtual operating system desktop.

8. The system of claim 5, wherein enabling one or more users to access the directory through use of the virtual computing resource includes adding one or more user accounts to a group of user accounts within the virtual computing resource.

9. The system of claim 8, wherein the one or more services further:
    receive, from a computer system, one or more access tokens, the one or more access tokens specifying an identifier corresponding to a user; and
    as a result of the identifier corresponding to a user account of the one or more user accounts, establish a communications channel between the virtual computing resource and the computer system.

10. The system of claim 9, wherein:
- the one or more access tokens further specify a network address of a network gateway usable to establish the communications channel with the virtual computing resource; and
- the one or more services further establish the communications channel with the virtual computing resource as a result of the network gateway receiving the one or more access tokens.

11. The system of claim 5, wherein the one or more services further:
- establish a communications channel with a directory domain controller of an on-premises network, managed on behalf of a customer, through a virtual network interface; and
- transmit, through the communications channel, the second request to the directory domain controller to enable joining of the virtual computing resource and the directory.

12. The system of claim 5, wherein the virtual computing resource is a virtual machine instance.

13. A non-transitory computer-readable storage medium having stored thereon executable instructions that, when executed by one or more processors of a computer system, cause the computer system to at least:
- transmit a request to join a virtual computing resource to a directory, the request including a set of encrypted domain join credentials decryptable by the virtual computing resource and usable to enable joining of the virtual computing resource to the directory;
- provision the virtual computing resource;
- transmit, to the directory, a second request to join the virtual computing environment to the directory, the second request including the set of domain join credentials and one or more machine credentials corresponding to the virtual computing resource;
- cause a computer account to be added to the directory, the computer account being accessible using the one or more machine credentials; and
- enable one or more users to access the directory through use of the virtual computing resource.

14. The non-transitory computer-readable storage medium of claim 13, wherein the instructions further comprise instructions that, when executed by the one or more processors, cause the computer system to add one or more user accounts to a group of user accounts comprising the one or more users to enable the one or more users to access the directory using the virtual computing resource.

15. The non-transitory computer-readable storage medium of claim 13, wherein the instructions further comprise instructions that, when executed by the one or more processors, cause the computer system to:
- receive, from a second computer system, one or more access tokens, the one or more access tokens specifying an identifier for a user authorized to access the virtual computing resource; and
- establish a communications channel between the virtual computing resource and the second computer system.

16. The non-transitory computer-readable storage medium of claim 15, wherein the instructions further comprise instructions that, when executed by the one or more processors, cause the computer system to:
- transmit the identifier for the user to a network gateway usable to establish the communications channel with the virtual computing resource; and
- establish the communications channel with the virtual computing resource as a result of the network gateway receiving the one or more access tokens specifying the identifier corresponding to the user.

17. The non-transitory computer-readable storage medium of claim 13, wherein the instructions further comprise instructions that, when executed by the one or more processors, cause the computer system to monitor the directory to ensure that the request to join the virtual computing resource to the directory is fulfilled.

18. The non-transitory computer-readable storage medium of claim 13, wherein the instructions further comprise instructions that, when executed by the one or more processors, cause the computer system to:
- establish a communications channel with a directory domain controller, the directory domain controller operating in a network environment managed on behalf of a customer, through a virtual network interface; and
- transmit, through the communications channel, the request to the directory domain controller to enable joining of the virtual computing resource and the directory.

19. The non-transitory computer-readable storage medium of claim 13, wherein the directory is a managed directory managed on behalf of one or more administrators of an on-premises network, the on-premises network being managed on behalf of a customer, within a managed directory service provided by the virtual computing resource service provider.

20. The non-transitory computer-readable storage medium of claim 13, wherein the set of encrypted credentials are domain join credentials usable to authenticate a domain user of the virtual computing resource and are associated with an account specifying one or more permissions for accessing and creating computer objects within the directory.

* * * * *

UNITED STATES PATENT AND TRADEMARK OFFICE
CERTIFICATE OF CORRECTION

| | | |
|---|---|---|
| PATENT NO. | : 9,565,190 B1 | |
| APPLICATION NO. | : 14/536137 | |
| DATED | : February 7, 2017 | |
| INVENTOR(S) | : Telvik et al. | |

It is certified that error appears in the above-identified patent and that said Letters Patent is hereby corrected as shown below:

On the Title Page

Column 1, item (71):
Applicants:
Erik Jonathan Telvik, Renton, WA (US);
Gaurang Pankaj Mehta, Seattle, WA (US);
Ajit Nagendra Padukone, Bellevue, WA (US);
Chirag Pravin Pandya, Sammamish, WA (US);
Colin Harrison Brace, Mercer Island, WA (US);
Deepak Suryanarayanan, Bellevue, WA (US);
Guruprakash Bangalore Rao, Bellevue, WA (US);
Krithi Rai, Redmond, WA (US);
Malcolm Russell Ah Kun, Kirkland, WA (US);
Sameer Palande, Seattle, WA (US);
Shon Kiran Shah, Redmond, WA (US);
Vivek Lakshmanan, Seattle, WA (US)

Should read as:
Amazon Technologies, Inc., Seattle, WA (US)

Signed and Sealed this
Sixth Day of June, 2017

Michelle K. Lee
*Director of the United States Patent and Trademark Office*